United States Patent
Dvorak et al.

(10) Patent No.: US 6,300,904 B1
(45) Date of Patent: Oct. 9, 2001

(54) NARROWBAND BASED NAVIGATION SCHEME

(75) Inventors: Mark D. Dvorak, Waseca; Jeffrey J. Kriz, Eden Prairie; Brian W. Schipper, Brooklyn Park, all of MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/328,472

(22) Filed: Jun. 9, 1999

(51) Int. Cl.$^7$ .................................................. G01S 3/02
(52) U.S. Cl. ........................................ 342/457; 342/463
(58) Field of Search .................................. 342/457, 463, 342/465, 464

(56) References Cited

U.S. PATENT DOCUMENTS

| | | | |
|---|---|---|---|
| 3,875,570 | * | 4/1975 | Litchford . |
| 4,740,792 | * | 4/1988 | Sagey et al. ......................... 342/457 |
| 5,099,245 | * | 3/1992 | Sagey ................................... 342/463 |
| 5,327,144 | | 7/1994 | Stilp et al. . |
| 5,512,908 | | 4/1996 | Herrick . |
| 5,926,133 | * | 7/1999 | Green, Jr. ............................. 342/457 |

FOREIGN PATENT DOCUMENTS

| | | |
|---|---|---|
| 0140594A | 1/1991 | (EP) . |
| 2250154A | 5/1992 | (GB) . |

* cited by examiner

Primary Examiner—Theodore M. Blum
(74) Attorney, Agent, or Firm—John G. Shudy, Jr.

(57) ABSTRACT

Multiple pulses of narrow band signals of varying frequency are detected by multiple spaced apart receivers such that average time difference of arrivals of the signals from an item to be located are determined. The average time differences are used to calculate a position of the item to be located with a desired accuracy, such as within one meter in one embodiment. One of multiple receivers or rangers initiates a location process by transmitting a sync pulse. The sync pulse is received by a scout and other rangers. The scout is a small robot which acts as a transponder, sending out its own narrow band return pulse in response to the sync pulse. Each ranger then determines a difference in time between the sync pulse it receives and the return pulse generated by the scout. The location process is then repeated again at different selected narrow band frequencies, and an average of the difference in time at each ranger is determined. Each ranger is networked together via a standard wireless network, and also obtains position information via standard GPS methods. An iterative calculation of the location of the scout is used to improve an estimated position solution. Time difference of arrival between two rangers is expressed as an equation with three unknown variables, x, y and z, which define a position of the scout in three dimensional space. The locus of a point that satisfies this equation is hyperbolic. The iterative calculation uses a least squares approach to improve the estimated position to within a required tolerance.

30 Claims, 6 Drawing Sheets

NARROWBAND BASED NAVIGATION SCHEME

The Government may have rights in this invention pursuant to Contract No. MDA972-98-C-0008.

FIELD OF THE INVENTION

The present invention relates to position determination, and in particular to the determination of the position of a transmitter without resorting to wideband signals.

BACKGROUND OF THE INVENTION

Locating items using radio location systems has been performed using many different systems. Global positioning systems are quite useful for determining the location of an item which is outdoors, or otherwise has a clear path for signals from GPS satellites. However, when items are indoors, or otherwise surrounded by other items which might reflect such signals, it is difficult to determine an accurate time of arrival of location signals transmitted or received by the items. This is referred to as a multipath problem because location signals may take multiple paths, and appear to arrive at one or more receivers at different times. RF transmitters are commonly used for such applications. They are also used on robots or other items which may be outfitted with various sensors, and move within a building or other structure. It becomes imperative to know within a small distance, where such items are located.

Methods for determining the position of an RF transmitter have been studied extensively. A common approach to these systems is to use time difference of arrival (TDOA) information. In these TDOA systems a number of receivers detect a signal that was transmitted. The receivers must determine when the signal was received. The accuracy required for the timing information depends on the precision needed in determining the transmitter's location. If a position accuracy of one meter is needed, then the accuracy of the timing information must be better than approximately 3 nanoseconds. This relationship is fundamental and is simply due to the speed of light, which is 30 cm per nanosecond. The timing information is then converted into time difference data by calculating the difference in receive times between pairs of receivers. Knowledge of the position of two receivers, and knowledge of the difference in time of arrival, determines a hyperboloid which represents the potential positions of the transmitter. More than two receivers are used to create multiple hyperboloids, whose intersection represent the actual position of the transmitter.

As these systems must typically determine the time of arrival of signals to a precision of approximately one nanosecond they have typically used wideband RF signals in order to allow the receivers to detect very fast rising edge pulses. U.S. Pat. No. 5,742,636 to Sanderford, Jr., uses a spread spectrum modulation to time stamp a received radio broadcast. Wideband approaches consume significant amounts of power, which is a precious commodity for small robot like items carrying sensors. Further, such signals are not directly compatible with the desire for narrowband RF signals that are used to carry data. There is a need for a location system that is accurate to fairly small distances to aid in locating items coupled to the source of RF signals. The system must also provide location information in real time to handle items that move. There is a further need for location systems that operate with low power requirements for the items being located. There is still a further need for such systems wherein the devices that detect the items are mobile.

SUMMARY OF THE INVENTION

Multiple pulses of narrow band signals of varying frequency are detected by multiple spaced apart receivers such that average time difference of arrivals of the signals from an item to be located are determined. The average time differences are used to calculate a position of the item to be located with a desired accuracy, such as within one meter in one embodiment. By using the average time difference at different frequencies, multipath propagation inaccuracies are minimized.

In one embodiment of the invention, the spaced apart receivers are relatively large robots, referred to as rangers. One of the rangers initiates a location process by transmitting a sync pulse. The sync pulse is received by a scout and other rangers. The scout is a small robot which acts as a transponder, sending out its own narrow band return pulse in response to the sync pulse. Each ranger then determines a difference in time between the sync pulse it receives and the return pulse generated by the scout. By using narrowband frequencies for the return pulse, power requirements are reduced.

This process is repeated multiple times, with each ranger moving a detection integration window further out in time to ensure that a leading edge of the return pulse is detected. The location process is then repeated again at different selected narrow band frequencies, and an average of the difference in time at each ranger is determined. In one embodiment, the frequency of the carrier for the return pulse is varied about approximately 900 MHz. The variation in one embodiment is in steps of 10 MHz. Measurements are taken at 900, 910, 920, 930, 940 and 950 MHz in one embodiment and an average of all measurements is used as the time difference. An alternative would be to perform various forms of statistical analysis, such as ignoring the high and low values.

In a further embodiment, each ranger is networked together via a standard wireless network, and also obtains position information via standard GPS methods. The position information and the difference information is communicated via the wireless network, and either the ranger that sent the sync pulse performs position calculations, or it transfers the information to another processing unit, either comprising a different ranger, or to a central processing unit, such as one that deployed the rangers.

An iterative calculation of the location of the scout is used to improve an estimated position solution. Time difference of arrival between two rangers is expressed as an equation with three unknown variables, x, y and z, which define a position of the scout in three dimensional space. The locus of a point that satisfies this equation is hyperbolic. Using four rangers provides three such time difference of arrival equations. Since there are inherent errors in the measurements, there is no unique solution. The iterative calculation uses a least squares approach to compute the estimated position to within a required tolerance.

In still a further embodiment, each ranger may have more than one antenna, separated by approximately at least ½ wavelength of the return pulse. The return pulse from each antenna is used to calculate time differences. A further alternative is to move the ranger between measurements. Combinations of these may also be used along with varying the frequency of the pulse to reduce the number of return pulses required to be output by the scout. This helps further conserve power. The use of RF narrowband frequencies versus wideband frequencies further simplifies the circuitry required in the scouts, which are power and space constrained.

DETAILED DESCRIPTION

In the following description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The description is divided into multiple sections. A first section describes a physical embodiment of a location system. Next, a system and method of determining a time difference of arrival of pulses is described. This is followed by a detailed description of an algorithm used to iteratively calculate position information using time difference of arrival information from multiple receivers.

Figure 1:
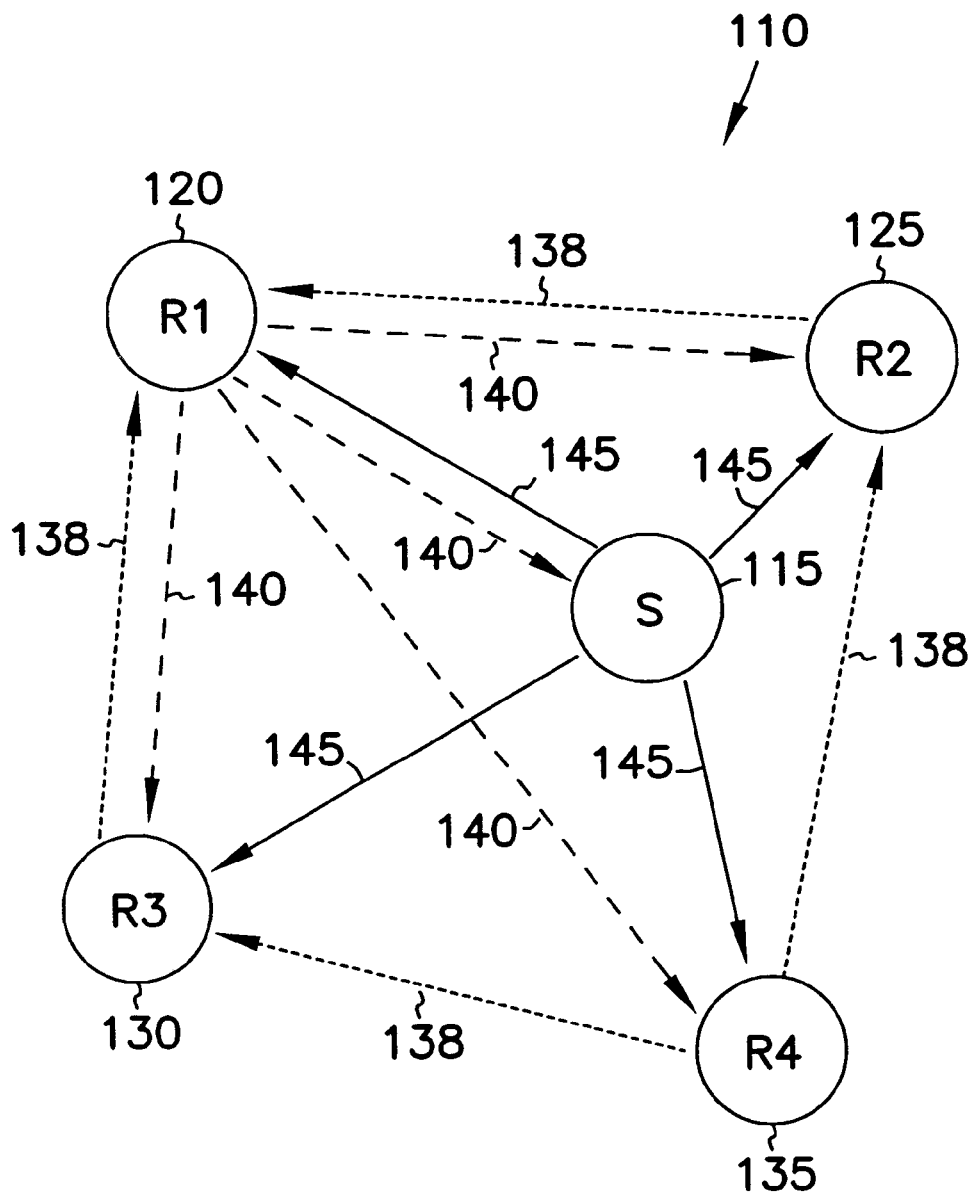
FIG. 1 is a block diagram of a location system in accordance with the present invention.

FIG. 1 shows a radio location system indicated generally at 110. An item to be located, scout 115, in one embodiment comprises a low power, small form factor robot with sensors. The robots are about six inches in length, and are mobile. In one embodiment, wheels are disposed on each end of a scout. Scout 115 in one embodiment is designed to navigate in a building or other similar structure, where multiple reflections of radio frequency electromagnetic radiation may occur. The system 110 also comprises multiple rangers, 120, 125, 130 and 135 which are larger robots. The multiple rangers are communicatively coupled as by a wireless local area network (LAN) 138 to provide information to each other. Such information includes position information as determined via a common GPS location system at each ranger.

In one embodiment, each ranger contains a plurality of scouts, which it deploys in one of many ways. A grenade type launcher may be used, or the scouts may be simply released and navigate into a structure to be investigated. The scouts are small in size and to conserve power, use narrow band signals as much as possible. The scouts carry a small suite of mission sensors, such as chemical, video, RF spectral sensors and others to obtain desired information about the structure and what is inside of it.

A selected ranger, such as ranger 120 has RF circuitry, which is designed to transmit a synchronization pulse 140 at a desired frequency, such as at 900 MHz. Each of the other rangers also has RF circuitry which detects the pulse, and starts a timer when the pulse is received. The scout 115 also detects the pulse, waits for a short period of time, and then transmits a respond pulse 145, acting in effect as a transponder. Each of the rangers then waits for the respond pulse, and collects information to determine the delay between reception of the sync pulse and the scout's respond pulse. Either the information, or the delay itself is communicated via the LAN to scout 115.

Figure 2:
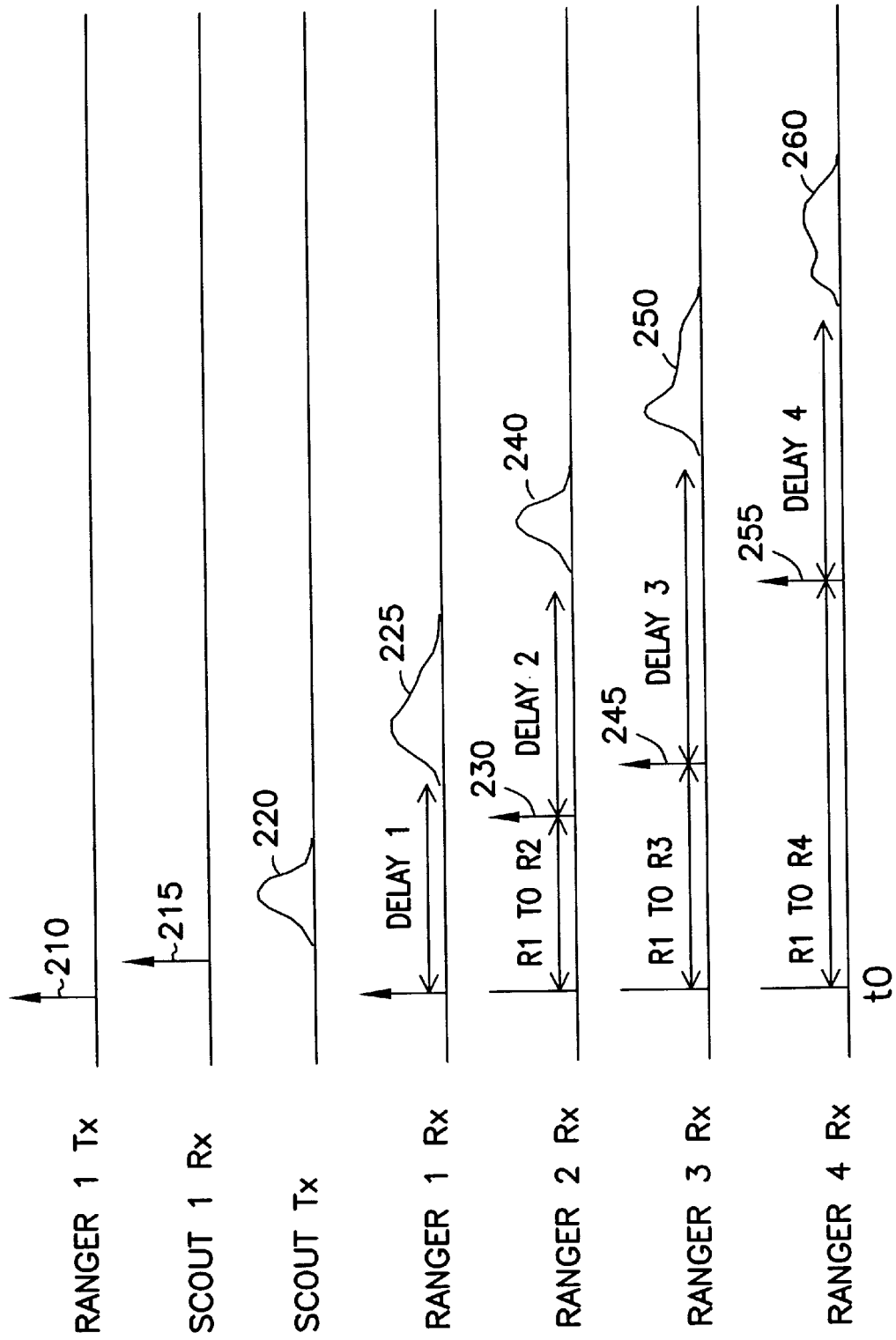
FIG. 2 is a timing diagram of pulses sent and received in the location system of FIG. 1.

FIG. 2 is a timing diagram showing how the timing of sync and respond pulses being transmitted and detected as arriving at rangers and the scout. At time t0, ranger 120 transmits the sync pulse as shown at 210. Scout 115 receives the sync pulse at 215, and after a short delay, retransmits the pulse 220, or generates a new, respond pulse at a desired frequency and having a narrow bandwidth. The short delay is sufficient to allow the scout time to reconfigure from receive to transmit modes. As previously discussed, the frequency of the carrier wave of the respond pulse is approximately 900 MHz in one embodiment, but may be any selected frequency or range of frequencies that is easily detected given the environment about the scout. Radio frequencies are typically used due to their ability to pass through normal buildings and other structures which are to be sensed and/or observed.

Ranger 120 then detects the pulse at 225, and since it is aware of the time at which it transmitted the sync pulse, can directly calculate a delay, delay 1, between the sending of the sync pulse and the reception of the return pulse. Ranger 125 receives the sync pulse at 230 some time, R1 to R2, after it is sent by ranger 120, and then receives the return pulse at 240, and a second delay, delay 2 is calculated as the time between the receipt of both pulses. Similarly, ranger 130 receives the sync pulse at 245 defining an R1 to R3 time, and receives the return pulse from scout 115 at 250, defining a delay 3 as the time between receipt of the pulses. Finally, ranger 135 receives the sync pulse at 255, defining a time of R1 to R4, and receives the return pulse at 260, defining a time between arrival of delay 4.

Multiple sync pulses and sets of delay times are referred to as a single measurement. Measurements may be taken at multiple different frequencies, each frequency potentially being affected differently by multipath environments. The multiple measurements are processed to determine differences between the time delay values at multiple rangers. This results in a set of time difference of arrival information between rangers, which may then be used to determine the position of the scout within a desired margin of error. Redundant hardware may also be provided on each ranger to provide sets of time difference of arrival information, including spaced apart receivers.

The calculation of the time difference of arrival information is rather straight forward, and results in the cancellation of the delay at the scout between reception of the sync pulse and transmission of the return pulse. It is desired to make this time as short as possible to reduce the time required to locate the scout, and it is also desirable to make the delay as consistent as possible between different scouts. The time delays are expressed as:

Delay 1=($R1$ to $S$)+(Scout Delay)+($R1$ to $S$)

Delay 2=($R1$ to $R2$)=($R1$ to $S$)+(Scout Delay)+($R2$ to $S$)

Delay 3=($R1$ to $R3$)=($R1$ to $S$)+(Scout Delay)+($R3$ to $S$)

Delay 4=($R1$ to $R4$)=($R1$ to $S$)+(Scout Delay)+($R4$ to $S$)

where R1 to R4 correspond to rangers 120, 125, 130 and 135 and S refers to scout 115.

A time of arrival measurement processor on each ranger measures $Delay_1$. This information, and the GPS-derived ranger position data is collected via the LAN 138. Information needed for an algorithm to calculate the actual position of the scout 115 is determined by calculating the differences between these time delay values. It is referred to as time difference of arrival (TDOA) information:

Delay 2–Delay 1={(R2 to S)–(R1 to S)}–(R1 to R2)

The second term on the right hand side of the equation is calculated from the ranger position information, and the remaining term is the value needed in the TDOA algorithm. The other difference values, i.e.: Delay3–Delay1, Delay 3–Delay 2 etc., are calculated in the same way. An important point to note is that the value of the scout turnaround delay drops out during these calculations. This has an important advantage in minimizing the complexity of scout functionality required. An average of the TDOAs is provided by either initially averaging the delays at each ranger prior to transmission of the delays, or by calculating multiple TDOAs from the delays received from each ranger, and then averaging them. In either case, the average reduces multipath effects. Further statistical processing can also be used to remove data points that are obviously subjected to multipath anomalies.

Figure 3:
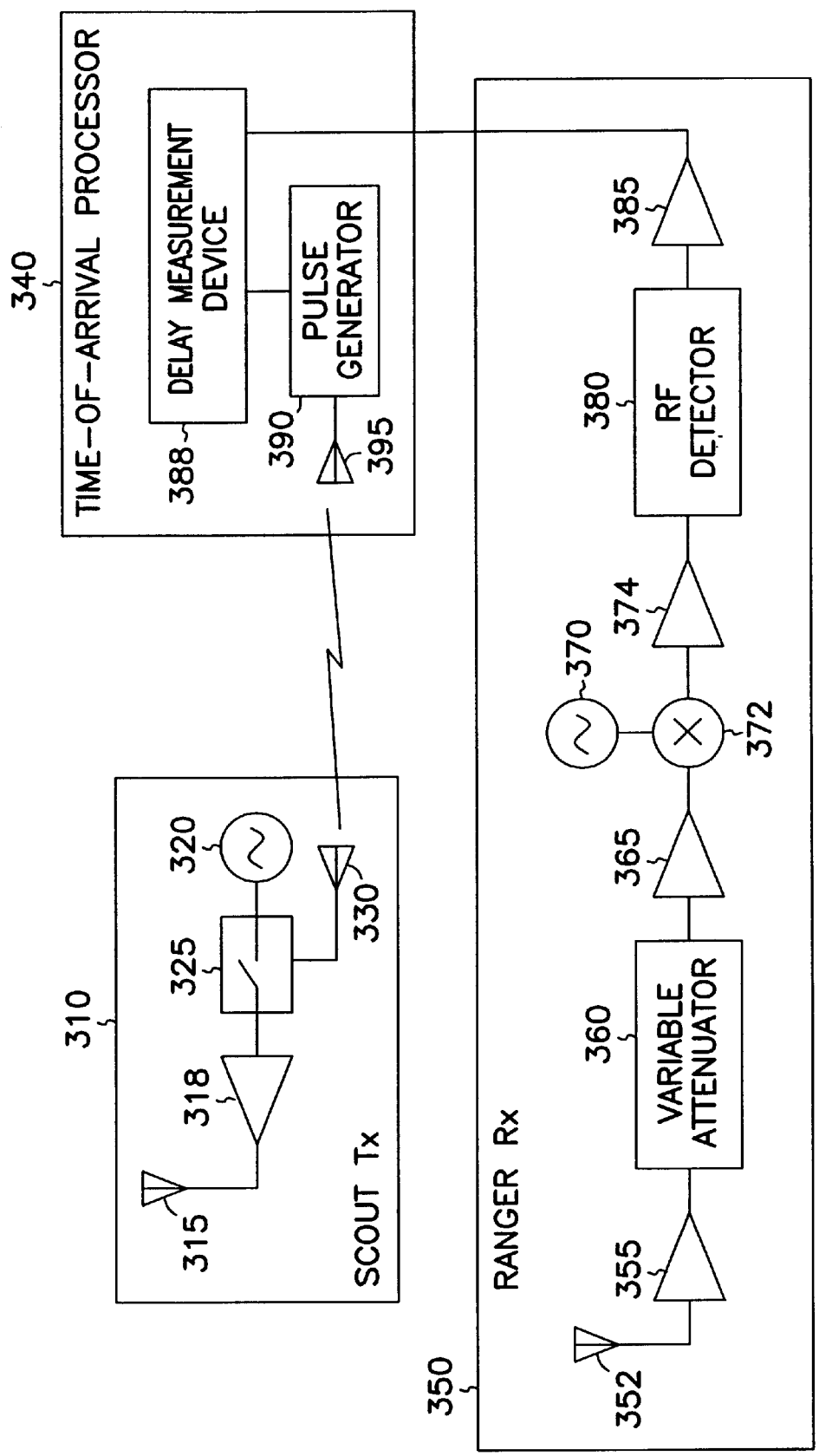
FIG. 3 is a block diagram of components of a scout and a ranger used in the system of FIG. 1.

FIG. 3 shows components of a typical ranger and scout. A scout, 310 typically may have an antenna 315 for receiving and transmitting pulses. An amplifier 318 amplifies signals generated from a variable frequency source 320, which is controllably coupled to the amplifier 318 by an intelligent switch/controller 325. Switch/controller 325 receives the sync pulse via antenna 315, or a second antenna 330, and provides a delay to reconfigure itself to close the switch for a short period of time to couple the frequency source 320 to the amplifier 318 to generate the response pulse.

A ranger is comprised of blocks 340 and 350. Block 350 has an antenna 352 which receives the response pulse and amplifies it with amplifier 355, while a variable attenuator 360 provides gain control. The output of the attenuator 360 is amplified by amplifier 365 and provided through mixer 372 to a further amplifier 374. A variable frequency source 370 is used as the local oscillator and is fed to mixer 372. An RF detector 380 is coupled to amplifier 374 and detects the desired baseband response pulses and provides them to a further amplifier 385. Amplifier 385 provides the detected baseband pulses to a delay measurement device 388 which is used to detect the leading edge of the response pulses. Block 340 is a time of arrival processor, which determines the difference in time between a sync pulse and a response pulse. This processing may be performed using an integration window which is selectively moved in time to detect the leading edge of the response pulses. In one of the rangers, it also serves as a position determination processor, iteratively solving time difference equations to find the position of the scout.

Figure 4:
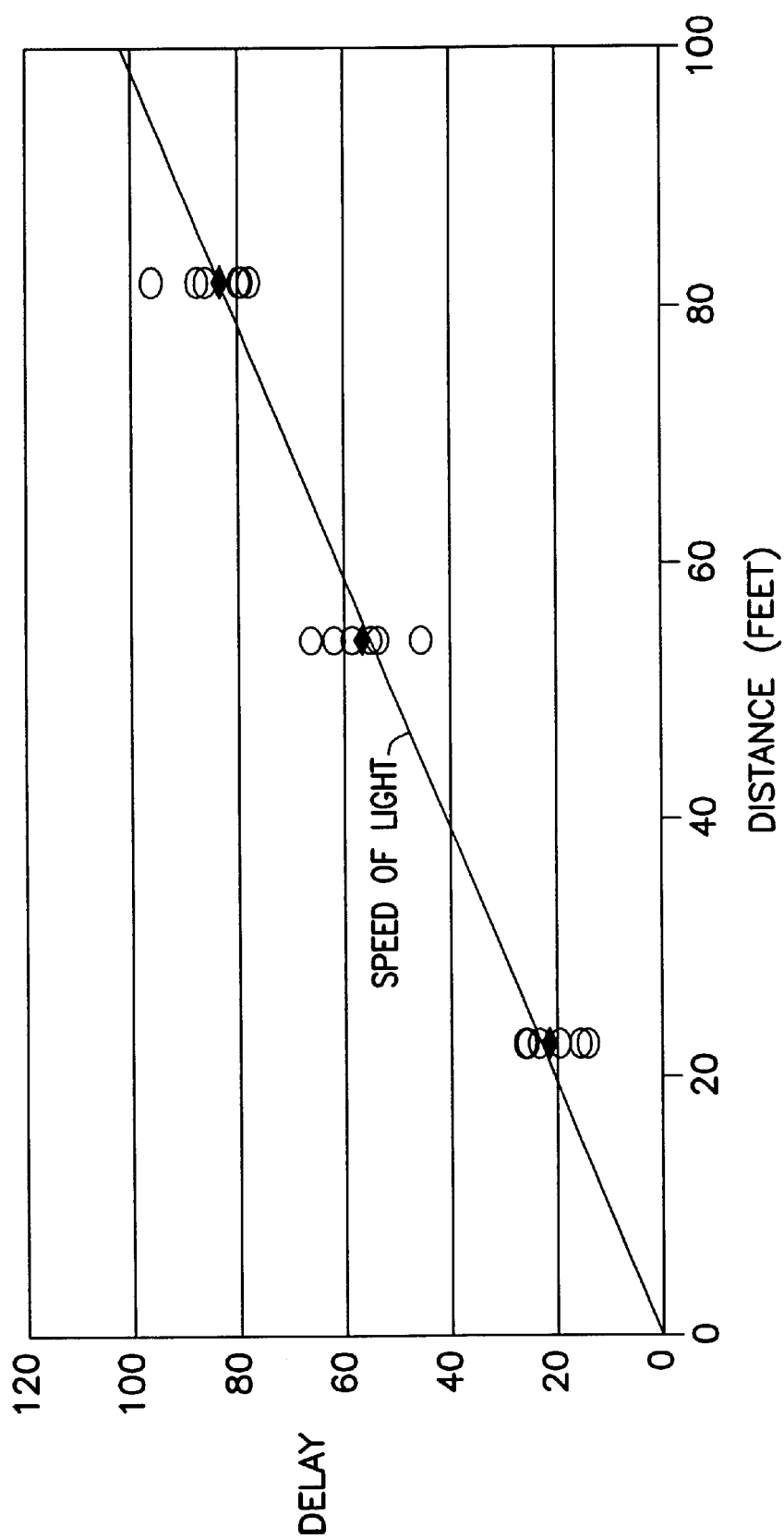
FIG. 4 is a graph of experimental data showing delay versus distance for multiple measurements where an object to be located is within line of sight.

FIG. 4 is a graph of experimental data showing delay in nanoseconds versus distance for multiple measurements where a scout is located within line of sight of a ranger. The circles are the measured delay at different frequencies near 900 MHz, while the diamonds are the average of the delays. The averaged results track closely the speed of light, which is shown as a straight line.

Figure 5:
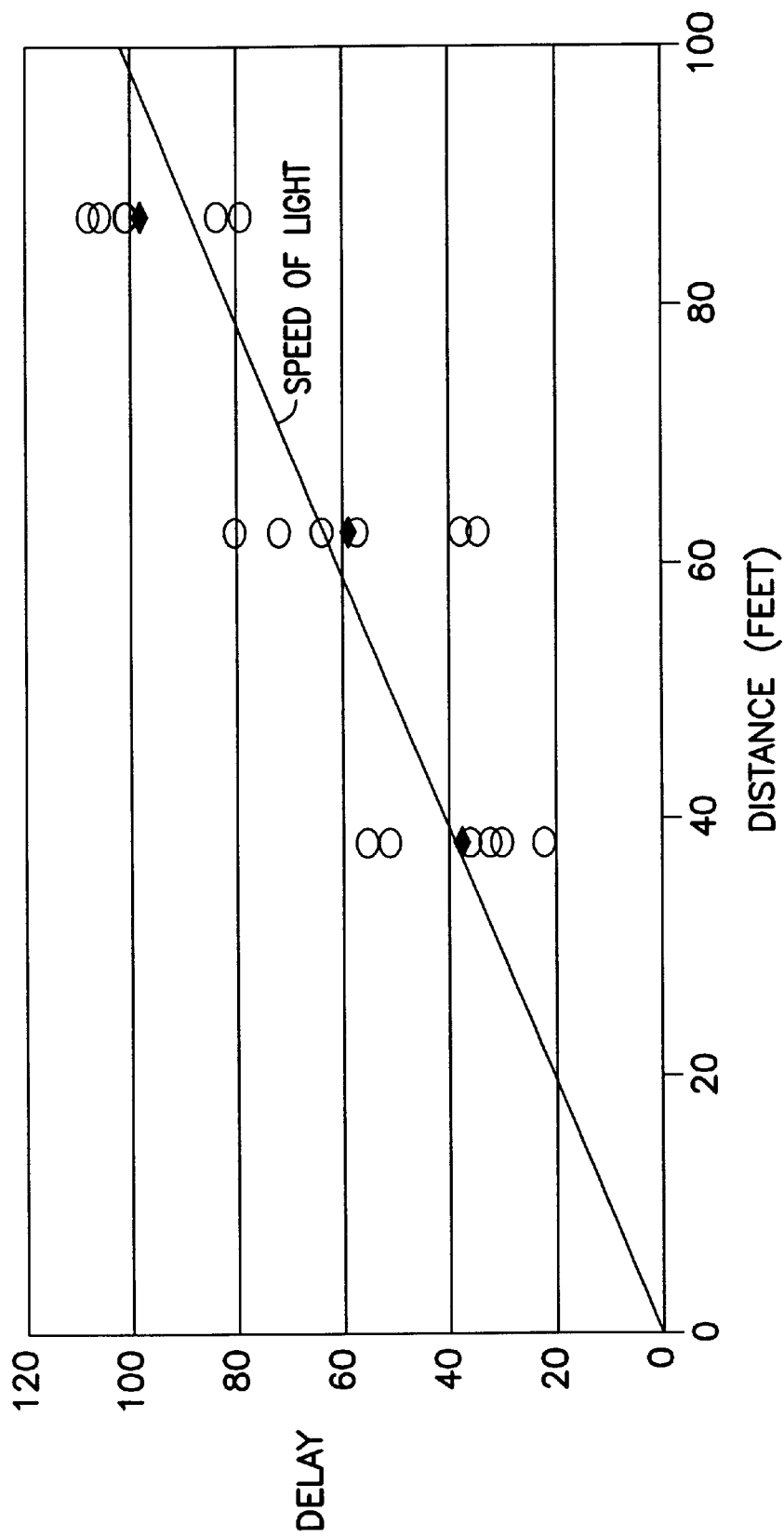
FIG. 5 is a graph of experimental data showing delay versus distance for multiple measurements where an object is not located within line of sight.

FIG. 5 is a graph of experimental data showing delay in nanoseconds versus distance for multiple measurements where a scout is not located within line of sight of a ranger. Again, the circles are the measured delay at different frequencies near 900 MHz, while the diamonds are the average of the delays. The averaged results again converge to the speed of light, which is shown as a straight line.

Range measurements supplied by the narrow band time of arrival measurement system are supplied to an algorithm which uses them to compute the location of the transmitting bodies (scouts). The algorithm also uses known position information about the time of arrival receivers (rangers) as provided by a relative GPS (RGPS) system. This time difference of arrival position determination approach and the algorithm are summarized as follows. Time of arrival measurements are differenced to form the time difference of arrival observables. This difference is typically required to cancel out unknown clock error terms arising from less than perfect clocks in the time of arrival receivers. Each time of arrival receiver is equipped with a GPS receiver and a mechanism to share its GPS measurements with all other (or one master) time of arrival receiver. The master time of arrival receiver when supplied with GPS measurements from other time of arrival receivers will compute a relative GPS (RGPS) solution. This solution provides a relative position solution of time of arrival receivers good to a foot or more depending on the GPS signal multipath conditions. The position determination algorithm uses the time difference of arrival observables along with time of arrival receiver locations as supplied by RGPS. The position solution can be thought of as the intersection of each half-hyperbola defined by each time difference of arrival observable. However, since the equations defining such hyperbolas are highly non-linear, there may be no unique solution.

Figure 6:
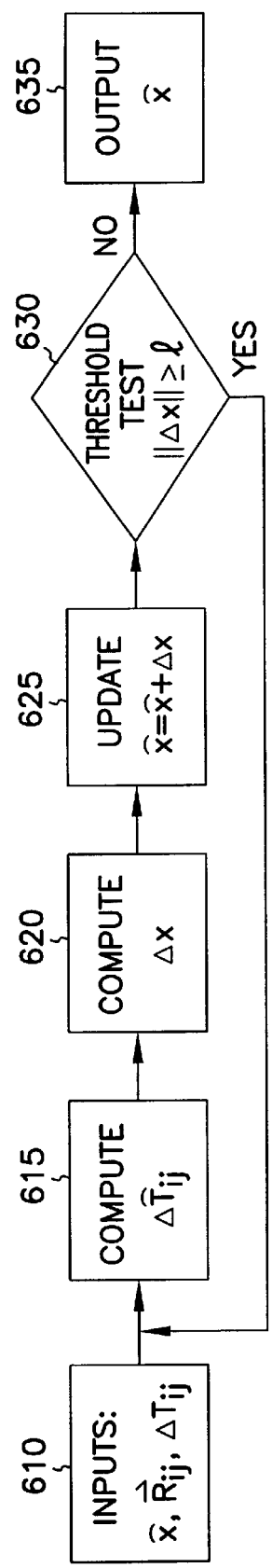
FIG. 6 is a flowchart showing an iterative position determination method based on time difference of arrival information.

FIG. 6 is a flowchart showing a high level iterative algorithm used to find a solution to the intersection of the hyperboloids to within a desired tolerance. Further detail and mathematical background is provided following the description of this figure. At 610, inputs including an estimated position x, ranger postions R and a time difference of arrival delta T are provided. From this information, a new time difference of arrival is calculated from the estimated positions at 615. At 620, a difference in the position is calculated, and an updated estimate is determined at 625. A threshold, 1, is used at 630 to determine whether or not to repeat or iterate on the new position. If yes, control is returned to block 615 to begin a new sequence of calculations. If the threshold, 1, is not exceeded, the updated estimated position is within tolerance, and is provided as an output at 635.

Further detail of the position determination iteration is now provided. Consider a signal source at point P(x,y,z), and two receivers at locations $R_1(x_1,y_1,z_1)$ and $R_2(x_2,y_2,z_2)$, respectively.

Assuming that the signal travels along a straight line from the transmitter to the receiver, the time taken for a signal to reach receiver $R_1$ from P is:

$$t_1 = 1/c(\sqrt{(x_1-x)^2+(y_1-y)^2+(z_1-z)^2}) \qquad (1)$$

where c is the propagation speed of the signal.

Likewise, the time taken for the same signal to reach receiver $R_2$ from P is:

$$t_2 = 1/c(\sqrt{(x_2-x)^2+(y_2-y)^2+(z_2-z)^2}) \qquad (2)$$

The TDOA measurement is defined as the difference in time between the arrival of a signal at two different point-locations. From equations (1) and (2), the error-free TDOA measurement that corresponds to the time difference between signal arrival at $R_1$ and $R_2$ is given by:

$$TD_{12} = 1/c[(\sqrt{(x_1-x)^2+(y_1-y)^2+(z_1-z)^2}) - (\sqrt{(x_2-x)^2+(y_2-y)^2+(z_2-z)^2})] \qquad (3)$$

The expression can be written generically to represent the TDOA measurement for receiver j with respect to receiver i as:

$$TD_{ij}=1/c[(\sqrt{(x_i-x)^2+(y_i-y)^2+(z_i-z)^2})-(\sqrt{(x_j-x)^2+(y_j-y)^2+(z_j-z)^2})] \quad (4)$$

The locus of a point that satisfies equation (4) is hyperbolic. The equation contains three unknown variables in x, y, and z, as the coordinates of receivers i, and j are known (using GPS), and $TD_{ij}$ is measured (a trivial problem if their clocks are synchronized). In order to determine the 3-dimensional location of the signal source, three independent TDOA measurements are required, which warrants the use of a minimum of four receivers. The solution of the location of the signal source lies in solving a set of highly non-linear equations of the form as shown in equation (4). Further receivers may be used to produce different sets of four receivers, with an average of the solution of each set being used as the location of the transmitter.

One way of solving a set of non-linear equations is by linearizing the measurement equations using an estimate of the solution and iteratively converging to the right solution using Newton's method.

In order to illustrate the approach used to mathematically represent the TDOA problem in the case where four receivers are used, assume that the time-difference measurements have been made with respect to receiver 1 located at $R_1$. The three measurement equations are then obtained as:

$$TD_{12} = \frac{1}{c}\left[\left(\sqrt{(x_1-x)^2+(y_1-y)^2+(z_1-z)^2}\right) - \left(\sqrt{(x_2-x)^2+(y_2-y)^2+(z_2-z)^2}\right)\right] \quad (5)$$

$$TD_{13} = \frac{1}{c}\left[\left(\sqrt{(x_1-x)^2+(y_1-y)^2+(z_1-z)^2}\right) - \left(\sqrt{(x_3-x)^2+(y_3-y)^2+(z_3-z)^2}\right)\right] \quad (6)$$

$$TD_{14} = \frac{1}{c}\left[\left(\sqrt{(x_1-x)^2+(y_1-y)^2+(z_1-z)^2}\right) - \left(\sqrt{(x_4-x)^2+(y_4-y)^2+(z_4-z)^2}\right)\right] \quad (7)$$

As previously indicated, these may be determined at each ranger, or at one predetermined ranger, referred to as a reference station. For ease of representation, the above equations can be written as a function of distances as:

$$R_{1j}=R_1-R_j \quad (8)$$

where $$R_{1j}=TD_{1j} \times c \quad (9)$$

is the 'distance equivalent' of the TDOA measurement obtained using receiver j; $R_1$ the distance between the source and receiver 1; and $R_j$ the distance between the source and receiver j.

Equation 8 is similar to error-free differential GPS in structure. Equations $R_{1j}$ can be linearized about an initial estimate using Taylor series expansion and retaining only the first order terms as follows:

$$R_{1j} = R_{1j} + \left.\frac{\partial R_{1j}}{\partial x}\right|_{(\hat{x},\hat{y},\hat{z})}(x-\hat{x}) + \left.\frac{\partial R_{1j}}{\partial y}\right|_{(\hat{x},\hat{y},\hat{z})}(y-\hat{y}) + \left.\frac{\partial R_{1j}}{\partial z}\right|_{(\hat{x},\hat{y},\hat{z})}(z-\hat{z}) \quad (10)$$

where $(\hat{x}, \hat{y}, \hat{z})$ is the initial estimate.

Let $$R=\sqrt{(x_1-x)^2+(y_1-y)^2+(z_1-z)^2} \quad (11)$$

Then, $$\left.\frac{\partial R}{\partial x}\right|_{(\hat{x},\hat{y},\hat{z})} = \frac{(x_1-\hat{x})}{\sqrt{(x_1-\hat{x})^2+(y_1-\hat{y})^2+(z_1-\hat{z})^2}} \quad (12)$$

$$\left.\frac{\partial R}{\partial y}\right|_{(\hat{x},\hat{y},\hat{z})} = \frac{(y_1-\hat{y})}{\sqrt{(x_1-\hat{x})^2+(y_1-\hat{y})^2+(z_1-\hat{z})^2}} \quad (13)$$

$$\left.\frac{\partial R}{\partial z}\right|_{(\hat{x},\hat{y},\hat{z})} = \frac{(z_1-\hat{z})}{\sqrt{(x_1-\hat{x})^2+(y_1-\hat{y})^2+(z_1-\hat{z})^2}} \quad (14)$$

Applying results of equations (12) through (14) on equation (10), the following is obtained:

$$R_{1j}=\hat{R}_{1j}+a_{i1}(x-\hat{x})+a_{i2}(y-\hat{y})+a_{i3}(z-\hat{z}) \quad (15)$$

where:

$$a_{i1} = \left(\frac{(x_1-\hat{x})}{\sqrt{(x_1-\hat{x})^2+(y_1-\hat{y})^2+(z_1-\hat{z})^2}} - \frac{(x_j-\hat{x})}{\sqrt{(x_j-\hat{x})^2+(y_j-\hat{y})^2+(z_j-\hat{z})^2}}\right)$$

$$a_{i2} = \left(\frac{(y_1-\hat{y})}{\sqrt{(x_1-\hat{x})^2+(y_1-\hat{y})^2+(z_1-\hat{z})^2}} - \frac{(y_j-\hat{y})}{\sqrt{(x_j-\hat{x})^2+(y_j-\hat{y})^2+(z_j-\hat{z})^2}}\right)$$

$$a_{i3} = \left(\frac{(z_1-\hat{z})}{\sqrt{(x_1-\hat{x})^2+(y_1-\hat{y})^2+(z_1-\hat{z})^2}} - \frac{(z_j-\hat{z})}{\sqrt{(x_j-\hat{x})^2+(y_j-\hat{y})^2+(z_j-\hat{z})^2}}\right)$$

Equation (15) can be written as:

$$R_{1j}-\hat{R}_{1j}=\delta R_{1j}=a_{i1}\delta x+a_{i2}\delta y+a_{i3}\delta z \quad (16)$$

and can be represented in matrix notation as:

$$\begin{bmatrix} \delta R_{12} \\ \delta R_{13} \\ \delta R_{14} \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} \delta x \\ \delta y \\ \delta z \end{bmatrix} \quad (17)$$

Equation 17 is of the form:

$$\delta R = H \delta X \qquad (18)$$

for which the Least Squares solution for $\delta X$ is obtained as:

$$\delta X = (H^T H)^{-1} H^T \delta R \qquad (19)$$

Then a new estimated position can be computed as $$\hat{x} = \hat{x} + \partial_x^\omega \qquad (20)$$

By starting with an a-priori estimate and iteratively minimizing the variation in the prediction to within required tolerance, the position estimate converges to the right solution. However, as the problem is non-linear, insufficient information could lead to a scenario wherein possible solutions to the problem could potentially be within allowed distances. This requires the a-priori estimate to be judiciously picked, or the possibility of providing the system with further information in order to be able to filter-out the wrong solution.

In order to select the a-priori estimate, it is desired to have the four rangers placed uniformly around the scout, or at least not in a straight line. When so arranged, the a-priori estimate can be selected to be close to the center point of the rangers. Convergence is assured in such a situation, provided the scout is between the rangers. If the rangers are all lined up on one axis, different starting points may have to be tried, with perhaps a limit placed on the number of iterations without convergence to within tolerance prior to selecting a new starting point.

CONCLUSION

It is to be understood that the above description is intended to be illustrative, and not restrictive. Many other embodiments will be apparent to those of skill in the art upon reviewing the above description. While the embodiment described is with respect to robotic scouts and rangers, other forms of receivers and transmitters may also be used. A home based system employs transmitters on moving entities in a house, and may provide position information for such entities, such as a pet, or moving appliance. The position information may then be provided to a home automation system to provide desired functions such as lighting control. The receivers are likely fixed in such an embodiment, and further information from sensors may be used to establish an initial position estimate for use in the iterative position determination process.

In a further embodiment, each ranger sends out its own sync pulse and measures the time it takes for the return pulse. This embodiment requires accurate timing between the receipt of the sync pulse by the scout and transmission of the return pulse. Scouts may also act as rangers, simply by including the ranger functionality within a scout. In this alternative, if some of the scouts that are to be located are out of range of the requisite number of rangers, once a scout has been located, the location information is provided to the scout, which then can act like a ranger in locating a next scout. It would be a simple matter of including the functionality of a ranger into a scout, and then activating that functionality by providing the location information to the scout. The location information would be treated in the same manner by the combined scout/ranger as location information the rangers receive via GPS.

A further alternative involves using a different frequency for the sync pulse compared to the return pulse. The scouts and rangers in this embodiment are configured to send sync pulses at one desired frequency, and generate and receive a return pulse at a frequency sufficiently different from the sync pulse to ensure that reflections of the sync pulse are not detected as return pulses. In addition to reflection differentiation, multi-path averaging benefits are provided. The scope of the invention should, therefore, be determined with reference to the appended claims, along with the full scope of equivalents to which such claims are entitled.

What is claimed is:

1. A method of detecting the location of an item (115), the method comprising:

determining multiple time difference of arrivals of pulses (140) and response pulses (145) from the item to be located as received by multiple receivers (120, 125, 130 and 135);

averaging the multiple time difference of arrivals (340); and iteratively solving for the location of the item until within a desired tolerance (340, 610, 615, 620, 625, 630 and 635).

2. The method of claim 1 wherein the multiple time difference of arrivals are based on different frequency pulses.

3. The method of claim 1 wherein the multiple time difference of arrivals are based on moving the receivers between selected pulses.

4. The method of claim 1 and further comprising determining the location of the receivers.

5. A method of detecting the location of an item, the method comprising:

sending a plurality of sync pulses from a predetermined one of a plurality of receivers;

sending response pulses from the item after receipt of sync pulses;

receiving the sync pulses and response pulses at each receiver;

determining multiple average time differences of arrival between selected receivers;

determining a location of each receiver; and determining the location of the item based on the time differences of arrival and location of the receivers.

6. A method of detecting the location of an item, the method comprising:

sending a plurality of sync pulses at different frequencies from a predetermined one of a plurality of receivers;

sending response pulses at such different frequencies from the item after receipt of sync pulses;

receiving the sync pulses and response pulses at each receiver;

determining multiple average time differences of arrival between selected receivers;

determining a location of each receiver; and determining the location of the item based on the time differences of arrival and location of the receivers.

7. The method of claim 6 wherein the location of the item is estimated, and variations in the estimate are iteratively minimized to within a desired tolerance.

8. The method of claim 7 wherein the time differences of arrival are determined between at least four receivers.

9. The method of claim 7 wherein the location of each receiver is provided by GPS.

10. The method of claim 7 wherein one of the receivers receives time of arrival information from the other receivers, and determines the location of the item.

11. The method of claim 10, wherein a wireless local area network is used to communicate between receivers.

12. The method of claim 10 wherein the time of arrival information is based on the difference in time between the sync and response pulses, and results in a cancellation of clock errors when converted to time difference of arrivals.

13. The method of claim 7 wherein the iterative solution is based on Newton's method.

14. The method of claim 13 wherein each iteration provides a difference between the estimated position and a difference determined from the time difference of arrival information, wherein the difference is compared to the desired tolerance and added to the estimate for the next iteration if not within tolerance.

15. A system for detecting the location of an item, the system comprising:
   means for determining multiple time difference of arrivals of pulses from the item to be located as received by multiple receivers;
   means for averaging the multiple time difference of arrivals; and
   means for iteratively solving for the location of the item until within a desired tolerance.

16. The system of claim 15 wherein the item comprises a transponder that receives sync pulses and transmits pulses in response thereto.

17. A system for detecting the location of an item, the system comprising:
   means for sending a plurality of sync pulses at different frequencies from a predetermined one of a plurality of receivers;
   means for sending response pulses at such different frequencies from the item after receipt of sync pulses;
   means for receiving the sync pulses and response pulses at each receiver;
   means for determining multiple average time differences of arrival between selected receivers;
   means for determining a location of each receiver; and
   means for determining the location of the item based on the time differences of arrival and location of the receivers.

18. A system for detecting the location of an item, the system comprising:
   a reference ranger that sends a plurality of sync pulses at different frequencies;
   a scout that sends a response pulses at such different frequencies after receipt of sync pulses;
   a plurality of rangers that receive the sync pulses and response pulses and provide position information to the reference ranger;
   the reference ranger determining multiple average time differences of arrival between selected rangers and determining the location of the scout based on the time differences of arrival and location of the receivers.

19. The system of claim 18 wherein the reference ranger is one of the plurality of rangers.

20. The system of claim 18 wherein the response pulses are narrowband based pulses.

21. The system of claim 18 wherein the reference ranger comprises a processor for iteratively solving for the position of the scout based on the time differences of arrival derived from at least four rangers.

22. The system of claim 18 wherein the reference ranger is coupled to the plurality of rangers by a wireless local area network.

23. A method of detecting the location of an item, the method comprising:
   sending a plurality of sync pulses from at least one of a plurality of receivers;
   sending response pulses from the item after receipt of sync pulses;
   receiving the response pulses;
   determining multiple average time differences of arrival of response pulses between selected receivers;
   determining a location of each receiver; and
   determining the location of the item based on the time differences of arrival and location of the receivers.

24. The method of claim 23 wherein each receiver sends its own sync pulses.

25. The method of claim 23 wherein the response pulses have a frequency different than that of corresponding sync pulses.

26. The method of claim 23 wherein an item acts as a receiver after its location has been determined.

27. A system for detecting the location of an item, the system comprising:
   a plurality of rangers, at least one of which sends a plurality of sync pulses at different frequencies;
   a scout that sends response pulses at different frequencies after receipt of sync pulses;
   a plurality of rangers that receive response pulses and provide time difference of arrival information;
   means for determining multiple average time differences of arrival between selected rangers and determining the location of the scout based on the time differences of arrival and location of the receivers.

28. The system of claim 27 wherein each receiver sends its own sync pulses.

29. The system of claim 23 wherein the response pulses have a frequency different than that of corresponding sync pulses.

30. The system of claim 23 wherein a scout is capable of acting as a ranger after its location has been determined to determine the location of a further scout.

* * * * *